US008092347B2

(12) United States Patent
Lanny

(10) Patent No.: US 8,092,347 B2
(45) Date of Patent: Jan. 10, 2012

(54) DEVICE FOR TRAINING AND/OR ANALYZING A USER'S MUSCULOSKELETAL SYSTEM

(75) Inventor: Michael Lanny, Bad Wildbad (DE)

(73) Assignee: MLS Lanny GmbH, Bad Wildbad (DE)

( * ) Notice: Subject to any disclaimer, the term of this patent is extended or adjusted under 35 U.S.C. 154(b) by 8 days.

(21) Appl. No.: 12/734,669

(22) PCT Filed: Nov. 13, 2008

(86) PCT No.: PCT/EP2008/009562
§ 371 (c)(1),
(2), (4) Date: May 14, 2010

(87) PCT Pub. No.: WO2009/062700
PCT Pub. Date: May 22, 2009

(65) Prior Publication Data
US 2010/0234187 A1    Sep. 16, 2010

(30) Foreign Application Priority Data

Nov. 16, 2007 (DE) .......................... 10 2007 055 060
Nov. 16, 2007 (DE) ..................... 20 2007 016 167 U

(51) Int. Cl.
*A63B 22/00* (2006.01)
(52) U.S. Cl. ................. 482/51; 482/79; 601/30
(58) Field of Classification Search ............... 482/51–53, 482/70, 71, 79, 80, 142, 143, 146, 147, 133–137, 482/92, 110; 119/700; 601/5, 23, 27–35, 601/84, 86, 87, 89, 90, 93, 98, 100, 101, 601/104
See application file for complete search history.

(56) References Cited

U.S. PATENT DOCUMENTS

| | | | | |
|---|---|---|---|---|
| 4,430,992 A * | 2/1984 | Christ | ............................ | 601/53 |
| 5,162,028 A * | 11/1992 | Wilkinson | ...................... | 482/52 |
| 5,372,563 A * | 12/1994 | Chien-Nan | ..................... | 482/79 |
| 6,217,491 B1 * | 4/2001 | Schiessl | ......................... | 482/92 |
| 6,620,117 B1 * | 9/2003 | Johnson et al. | ................. | 601/90 |
| 6,659,918 B2 * | 12/2003 | Schiessl | ......................... | 482/92 |
| 7,278,976 B1 * | 10/2007 | Chen | .............................. | 601/30 |
| 7,278,977 B1 * | 10/2007 | Chen | .............................. | 601/30 |
| 7,354,406 B2 * | 4/2008 | Kim | ................................ | 601/29 |

(Continued)

FOREIGN PATENT DOCUMENTS

DE    196 34 396 A1    3/1998

(Continued)

*Primary Examiner* — Loan Thanh
*Assistant Examiner* — Daniel Roland
(74) *Attorney, Agent, or Firm* — Rabin & Berdo, PC

(57) ABSTRACT

A device for training and/or analyzing a user's musculoskeletal system includes a stepping plate mounted on a base plate and periodically or aperiodically moveble by a driving mechanism encompassing a drive shaft on which a cam is disposed. On the bottom side of the stepping plate is a roll that rolls off an external surface of the cam. The stepping plate is connected to the base plate by vertical guides stationarily disposed on the base plate such that the mounted stepping plate follows a lifting movement caused by the driving mechanism. The cam has a first eccentric zone truncated such that the distance traveled by the roll rolling off the surface of the zone increases along the axial extension of the cam. A vertical adjusting mechanism allows the lift of the stepping plate to be modified by changing the position between the roll and the cam that cooperates therewith.

13 Claims, 7 Drawing Sheets

U.S. PATENT DOCUMENTS

| | | | |
|---|---|---|---|
| 7,367,957 B2 * | 5/2008 | Huang et al. | 601/31 |
| 7,530,959 B2 * | 5/2009 | Matano' et al. | 601/23 |
| 7,530,960 B2 * | 5/2009 | Cook | 601/46 |
| 2005/0033203 A1 * | 2/2005 | Son | 601/98 |
| 2007/0208282 A1 * | 9/2007 | Huang et al. | 601/30 |
| 2007/0213179 A1 * | 9/2007 | Trandafir | 482/51 |
| 2007/0259758 A1 * | 11/2007 | Zeng | 482/79 |
| 2007/0287939 A1 * | 12/2007 | Kim | 601/35 |
| 2008/0058167 A1 * | 3/2008 | Schippers | 482/51 |
| 2008/0114275 A1 * | 5/2008 | Wu | 601/27 |
| 2008/0254958 A1 * | 10/2008 | Ferrara | 482/142 |
| 2010/0184568 A1 * | 7/2010 | Schippers et al. | 482/51 |
| 2010/0234197 A1 * | 9/2010 | Huang et al. | 482/142 |

FOREIGN PATENT DOCUMENTS

| | | |
|---|---|---|
| DE | 199 44 456 A1 | 3/2001 |
| DE | 20 2005 012 174 U1 | 11/2005 |
| DE | 20 2006 006 828 U1 | 7/2006 |
| DE | 103 04 494 B4 | 10/2006 |
| DE | 10 2006 031 728 A1 | 2/2007 |
| EP | 0 929 284 B1 | 7/1999 |
| FR | 1 138 539 A | 6/1957 |
| WO | WO 2006/001044 A1 | 1/2006 |
| WO | WO-2006/091082 A1 | 8/2006 |
| WO | WO-2007-024103 A1 | 3/2007 |

* cited by examiner

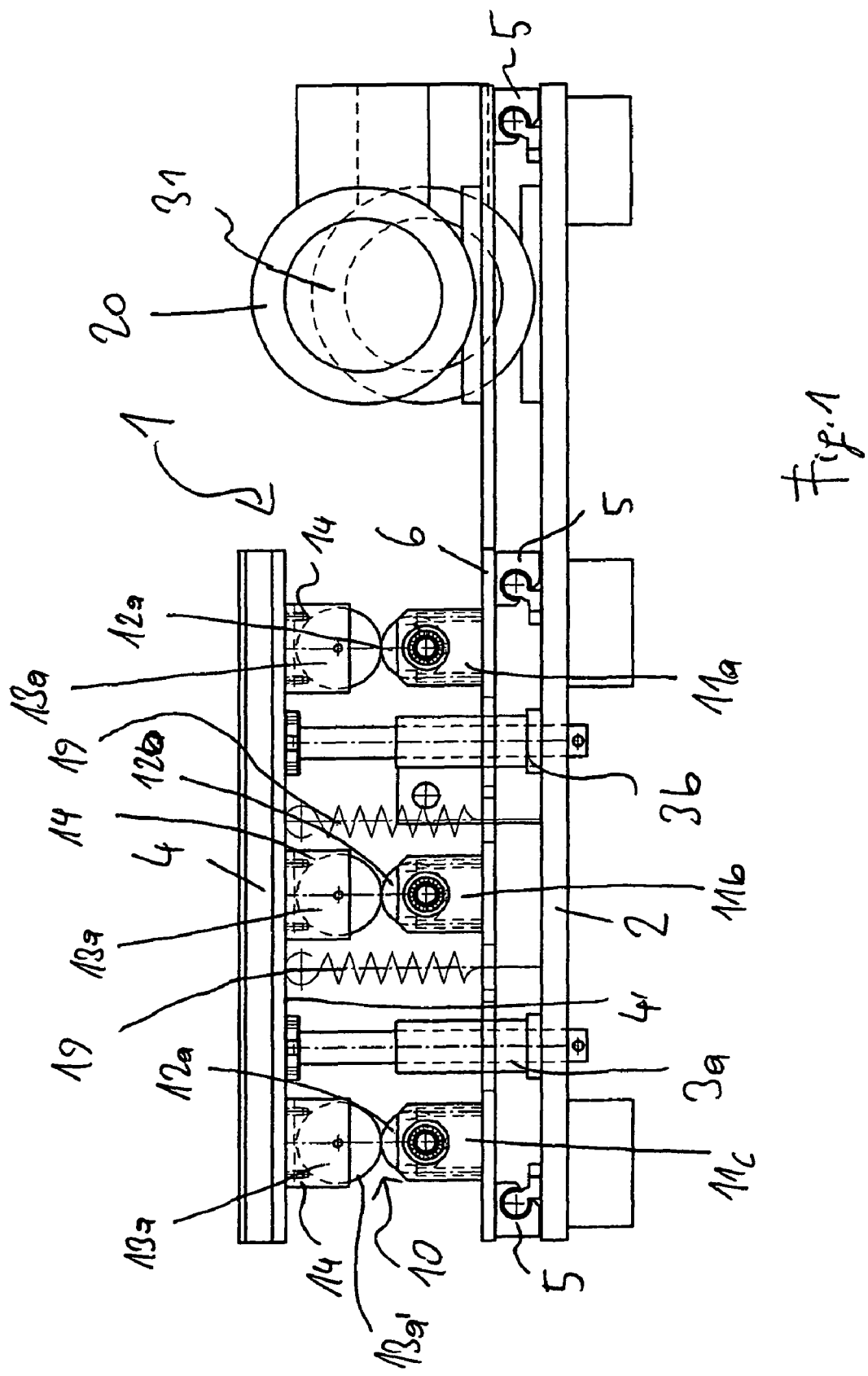

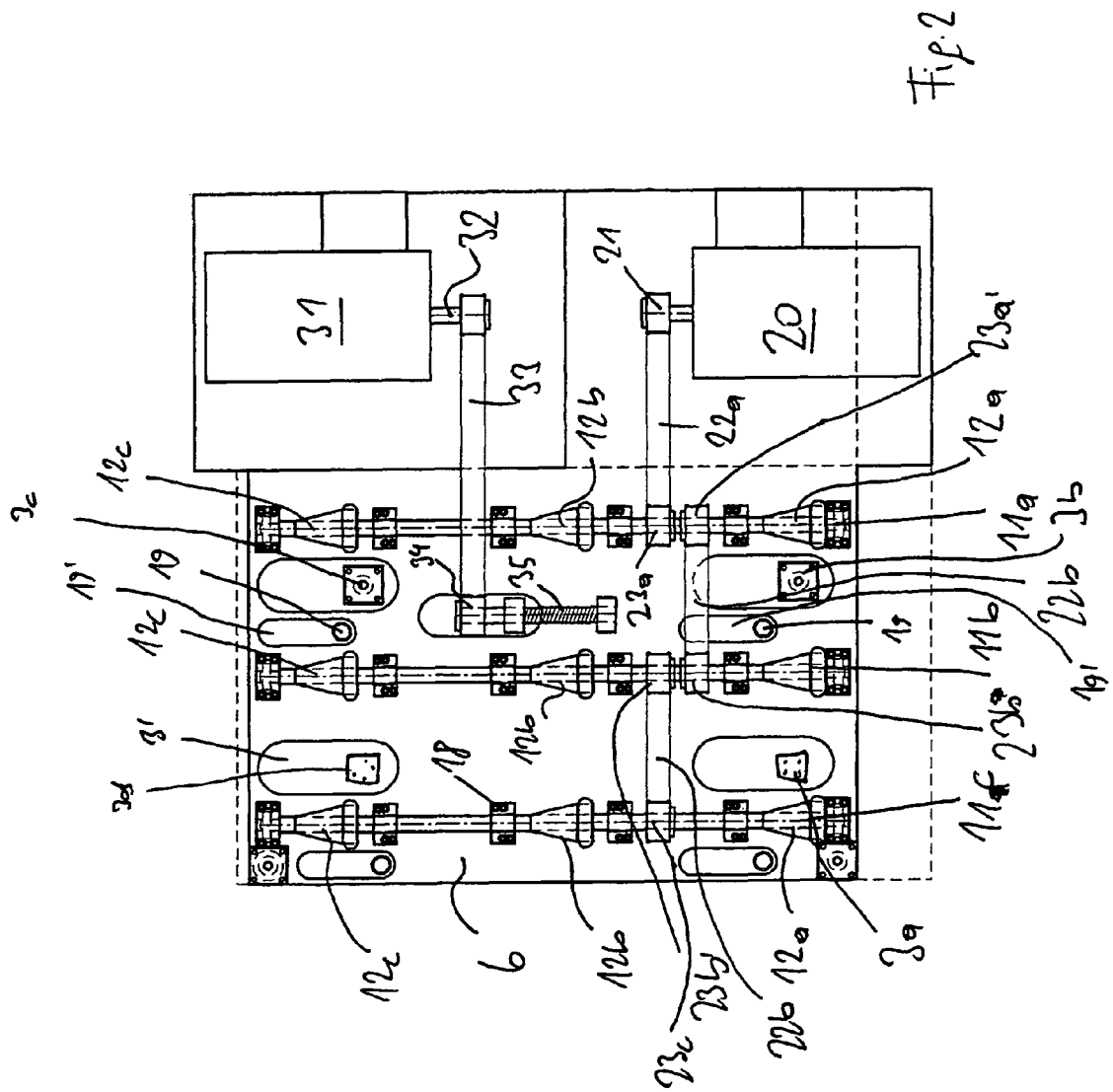

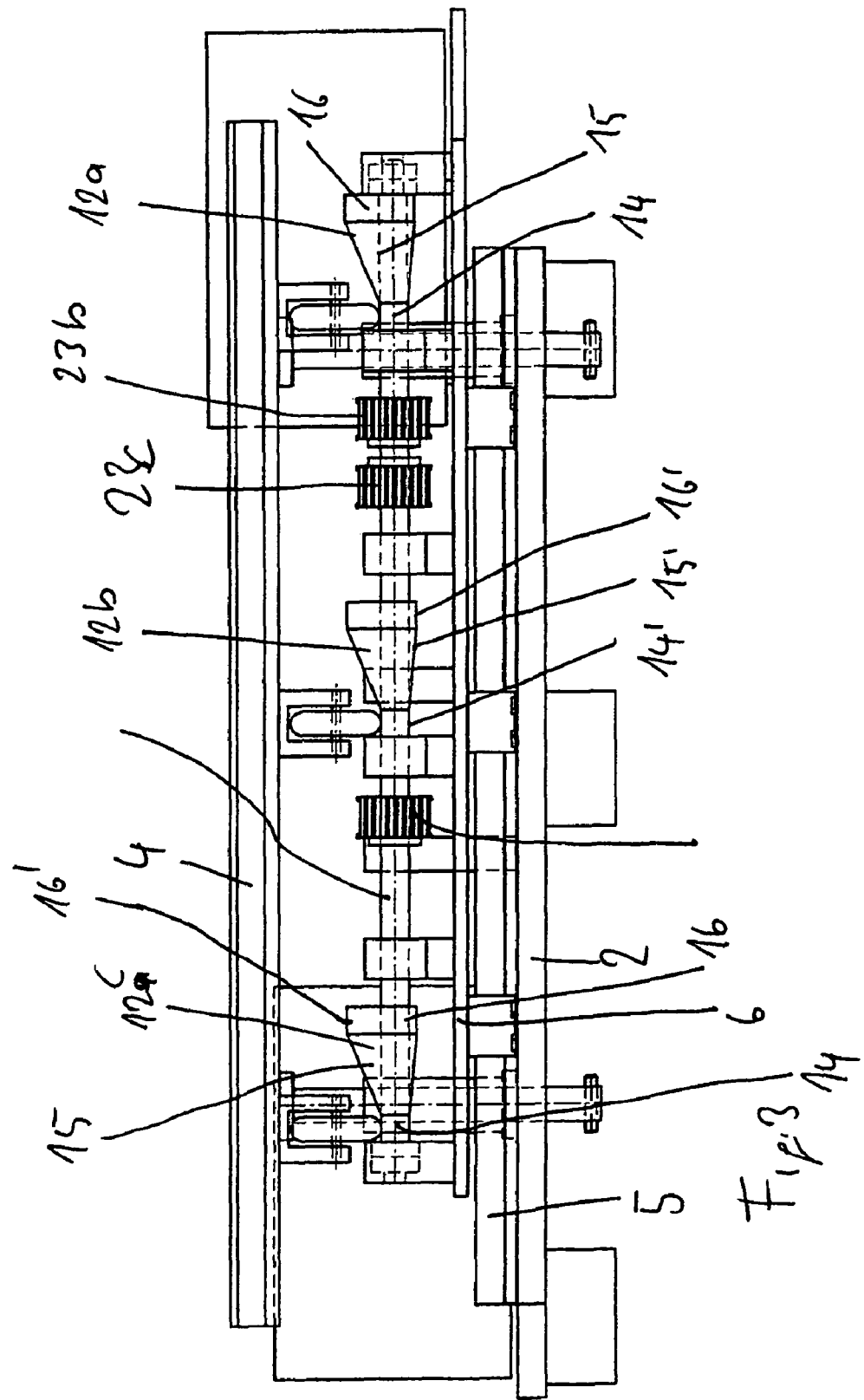

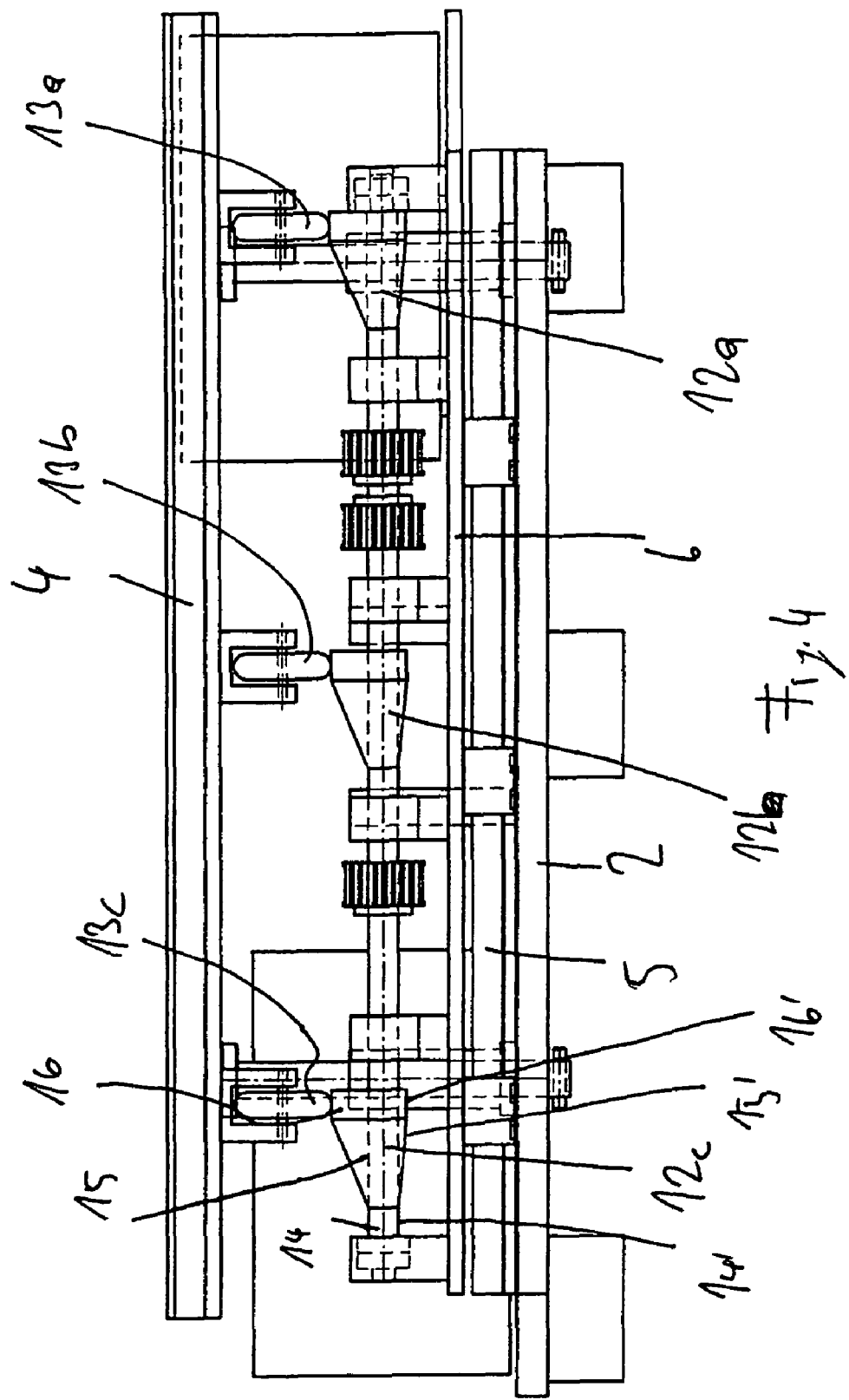

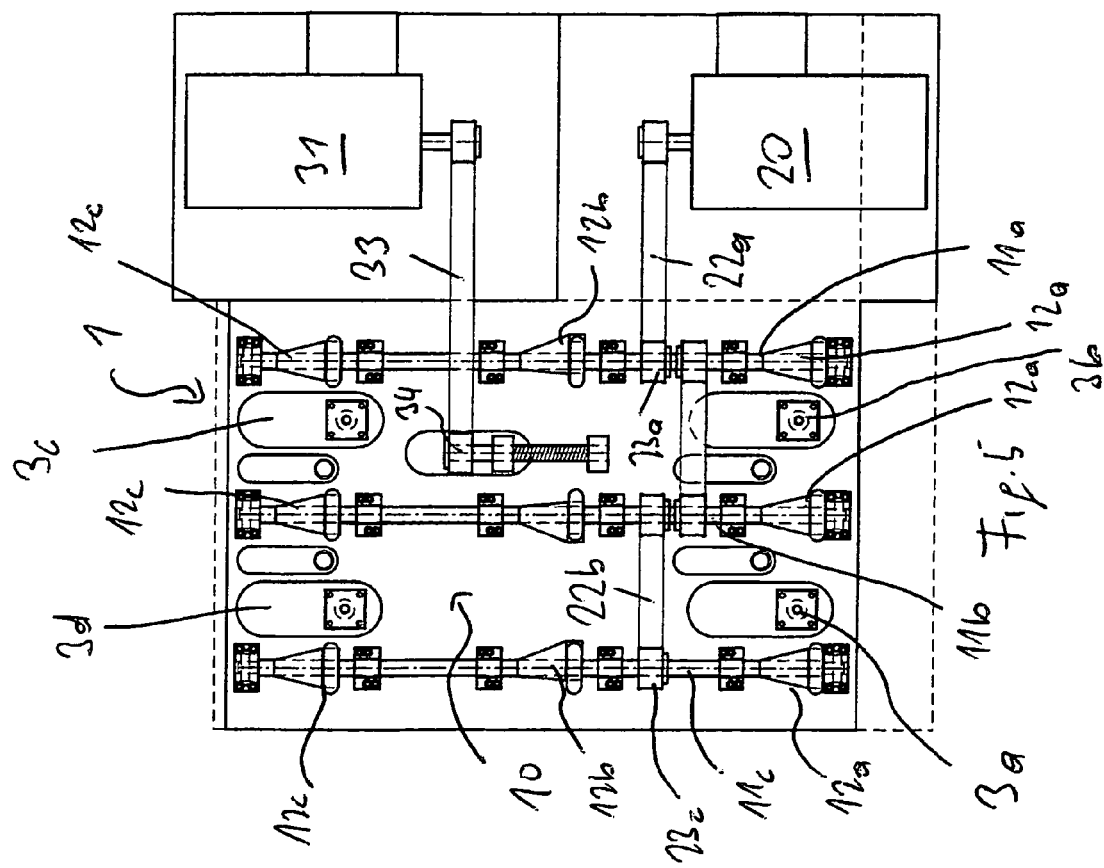

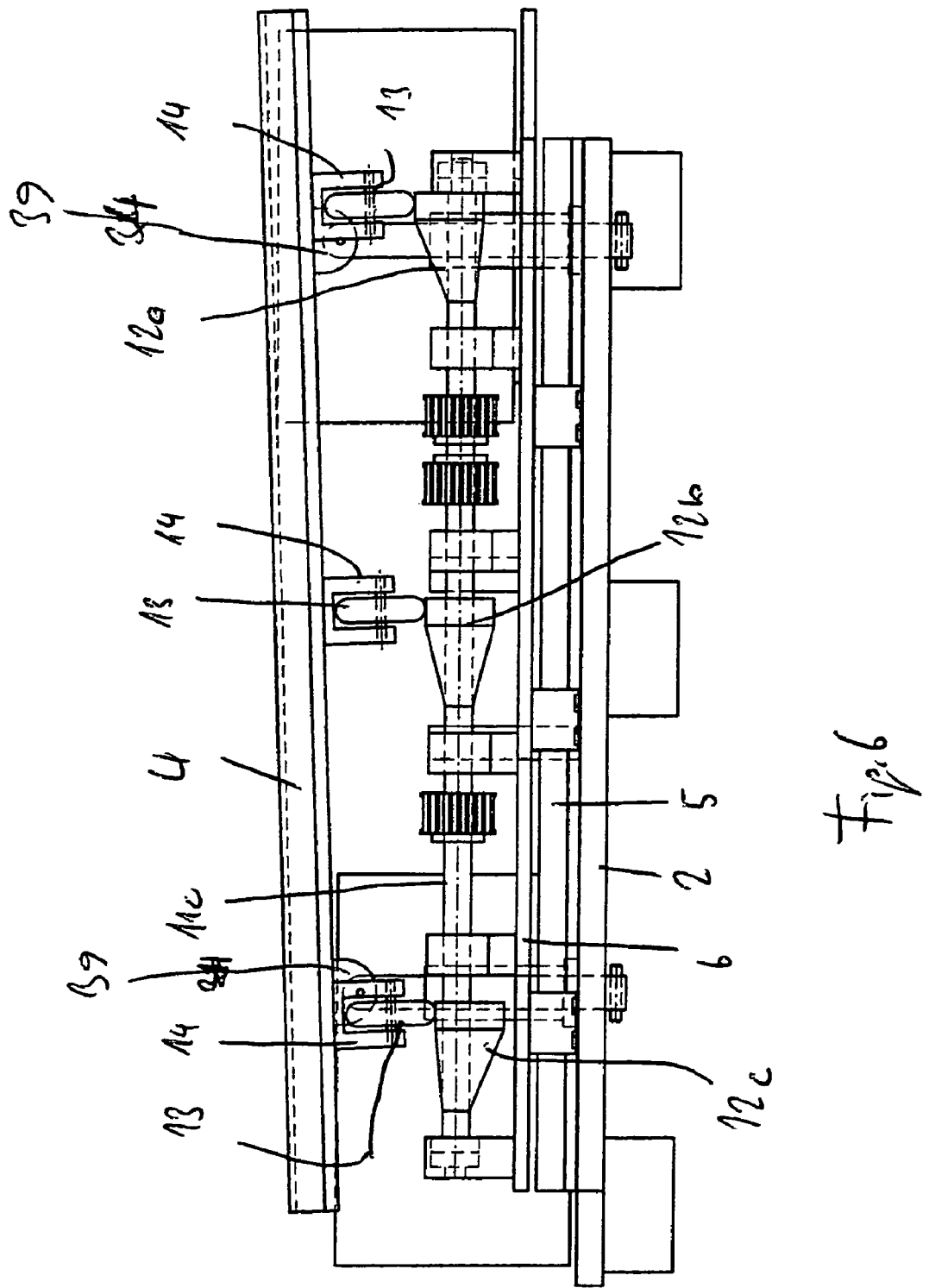

DEVICE FOR TRAINING AND/OR ANALYZING A USER'S MUSCULOSKELETAL SYSTEM

BACKGROUND

1. Technical Field

The present invention relates to a device for training and/or analyzing the musculoskeletal system of a user, wherein the device comprises a stepping plate which is mounted on a base plate and can be made to periodically and/or aperiodically move by means of a driving mechanism, wherein the driving mechanism comprises at least one drive shaft on which at least one cam is disposed, and wherein at least one roll arranged to roll on an outer surface of the at least one cam is disposed on the bottom surface of the stepping plate.

2. Background Information

Such devices have been widely known and are used for training a user's musculoskeletal system, or for analyzing it in order to detect any abnormal motion processes. WO 2007/024103 describes a device comprising two stepping plates that can be made to periodically move by means of a driving mechanism. This is effected using a shaft which is driven by a driving mechanism and which comprises two cams each of which coacts with a roll mounted on the stepping plates, orthogonally to the cams. It is a disadvantage of the known device that the amplitude of the periodical movements cannot be varied.

Another disadvantage of the known device is seen in the fact that the projecting stepping plate on which force is applied performs a tilting movement in addition to a vertical movement. This provides the disadvantage to stress the user's joints. Especially, designs of that kind cannot be used for horses or other hoofed animals because they would heavily stress the joints of the horses as horses are not in a position to balance out the tilting movement produced by the stepping plate.

EP 0 929 284 describes a device where a periodical sinusoidal movement is applied to the soles of a user's feet alternatingly on the one and the other side. To this end, the device comprises a rocker which is supported on the base plate via a pivot axis. The bottom of the rocker is engaged by lifting devices that can be driven by a common speed-controlled electric motor via respective V-belt drives. Each of the lifting devices comprises a drive shaft which is stationarily supported on the bottom plate and which carries a driving pinion. Connecting rods have one of their ends eccentrically supported on the drive shaft while their other ends act on the bottom of the rocker. It is possible with the aid of such a drive mechanism to make the rocker perform an oscillating lifting and lowering movement about its pivot axis and to adjust the oscillating frequency at option, within a predefinable range, via a control unit.

Such a device is absolutely convenient for training or for analyzing the musculoskeletal system of a user of low weight, for example of a man standing on the rocker. However, when a heavier user, for example a sport horse or a racing camel, is to be trained and/or its musculoskeletal system is to be analyzed, the described mechanical structure of the driving mechanism usually is not sufficient to achieve the required operating safety, or else the components of the driving mechanism must be made so sturdy that a device of that kind, adapted for example to horses, will become extremely bulky.

While when used for men it is absolutely possible to operate the described device from the very beginning at the desired oscillating frequency, this is not possible in the case of horses or other animals, especially flight animals, as horses that are made to stand on such a device, operating at a more than negligible frequency, tend to show flight reactions because they are not accustomed to such a moving ground.

SUMMARY

It is the object of the present invention to improve a device of the before-mentioned kind so that is will be easily possible to handle the loads occurring when the device is used by heavy users, while offering the possibility to vary the amplitude of the stepping plate.

That object is achieved by the invention in that the stepping plate of the device is connected to the base plate by means of vertical guides that are stationarily disposed on the base plate so that the stepping plate, supported in this way, can follow a vertical movement caused by the driving mechanism, that at least one cam has a first eccentric zone of truncated design so that the distance traveled by the roll, rolling on the surface of the said zone, increases along the axial extension of the cam, and that the device comprises a vertical adjusting mechanism which allows the lift of the stepping plate to be modified by changing the position between at least one roll and the cam that cooperates with it.

The features according to the invention advantageously provide a device that is particularly well suited, due to its mechanical structure, for training and/or for analyzing the musculoskeletal system of a heavy user. The at least one drive shaft, provided on at least one cam, and the roll that cooperates with the cam present a structure that is sufficiently robust to stand even higher loads. The device according to the invention comprises a vertical adjusting mechanism by means of which the amplitude of the vertical movement of the stepping plate, produced by the cams, can be varied. By providing that at least one cam with a first eccentric zone of truncated design so that the distance traveled by the roll rolling on the surface of that zone increases along the axial extension of the cam, in combination with the possibility to displace the cam relative to the rolls, the invention now provides an easy way of adjusting the vertical movement.

According to an advantageous further development of the invention, the cam comprises a non-eccentric zone. It is the advantage of that feature that the invention thereby allows, at the beginning of the process of training and/or of analyzing of the musculoskeletal system of the user, when the driving mechanism is already operating, to run the system in an operating mode where no vertical movement of the stepping plate occurs. A feature of that kind is especially advantageous in a starting phase of the training and/or the treatment for acquainting the user to the device of the invention.

Another advantageous development of the invention provides that the rising zone of the cam is followed by an eccentric final zone. That feature provides the advantage that the rolls will roll along the outer surface of the cam with particular stability in that final zone where the maximum lift can be produced by the device so that the device will operate smoothly even under maximum amplitude conditions.

Another advantageous further development of the invention provides that the device comprises two drive shafts, each with at least two cams, and that at least four rolls, each cooperating with at least one cam, are arranged on the bottom surface of the stepping plate. Such a design provides the advantage that in that case the vertical movement produced by the driving mechanism can be applied to all the four corner areas of the stepping plate so that a uniform up and down movement of the stepping plate can be achieved. A configuration of that kind provides the further advantage that no undesirable tilting movements of the stepping plate can occur, which is an advantage especially for horses as these have difficulty in compensating sudden tilting movements of the ground on which they are standing.

According to another advantageous further development of the invention the device comprises three drive shafts with at least two cams each and at least six rolls disposed on the bottom of the stepping plate. Such an embodiment provides the advantage of being especially stable.

Another advantageous further development of the invention provides that the adjusting device for the vertical movement comprises a linear adjusting unit and that the position of at least one cam can be varied relative to the cooperating roll by the linear adjusting unit. A feature of that kind provides the advantage that the vertical movement of the stepping plate can be varied with particular ease.

Another advantageous further development of the invention provides that the drive shafts of the driving mechanism are arranged on an intermediate plate disposed between the base plate and the stepping plate and that the position of the intermediate plate relative to the stepping plate and, thus, of the cams relative to the rolls arranged on the bottom surface of the stepping plate can be varied by linear displacement. An embodiment of that kind not only provides the advantage that the vertical movement can be adjusted in an easy way even for heavy users. Additionally, the described embodiment has the effect to allow the amplitude of the vertical movement of the mechanism to be easily and continuously varied by displacing the intermediate plate—during operation—between an initial value with a relatively small amplitude and a greater amplitude, and vice versa.

According to another advantageous further development of the invention the drive shafts can be driven synchronously, the cams preferably being arranged on the drive shafts in such a way that no phase shift exists between the different cams. A feature of that kind provides the advantage of an especially stable and uniform up and down movement of the stepping plate.

According to another further development of the invention the cams are arranged on the drive shafts in such a way that a phase shift exists between at least one cam of one drive shaft and at least one cam of another drive shaft, especially that a phase shift of 180° exists between that cam which acts upon a first corner area and another cam that acts upon a second corner area diametrically opposite to the first corner area. An embodiment of that kind is of particular advantage when the device according to the invention is used as a "piaffe machine" because this allows a horse to be easily trained to perform the steps and movements a horse has to go for a piaffe.

According to another advantageous further development of the invention at least two and, preferably, four of the before-mentioned devices can be combined to a machine for training and/or analyzing the musculoskeletal system of a user. In the case of a four-legged user it is possible in this case to assign to each leg a separate device that operates independently from the other devices. That feature allows each extremity of the user to be treated individually while training and/or analyzing his/its motion system. Especially, that embodiment is also suited for use as a "piaffe machine" as in this case the horse can be taught the before-mentioned stepping sequence in a simple way.

Further advantageous developments of the invention are the subject-matter of the sub-claims.

BRIEF DESCRIPTION OF DRAWINGS

Further details and advantages of the invention will be apparent from the embodiment of the invention that will be discussed hereafter with reference to the drawings. In the drawings:

FIG. 1 shows a front view of one exemplary embodiment of the device;

FIG. 2 shows a top view of that exemplary embodiment, with the stepping plate of the embodiment illustrated as a transparent part;

FIG. 3 shows a first side view of that exemplary embodiment;

FIG. 5 shows a top view of a second exemplary embodiment;

FIG. 6 shows a side view of a second exemplary embodiment; and

FIG. 7 shows an embodiment of a machine composed of four devices of the described kind.

DETAILED DESCRIPTION

Figure 4:
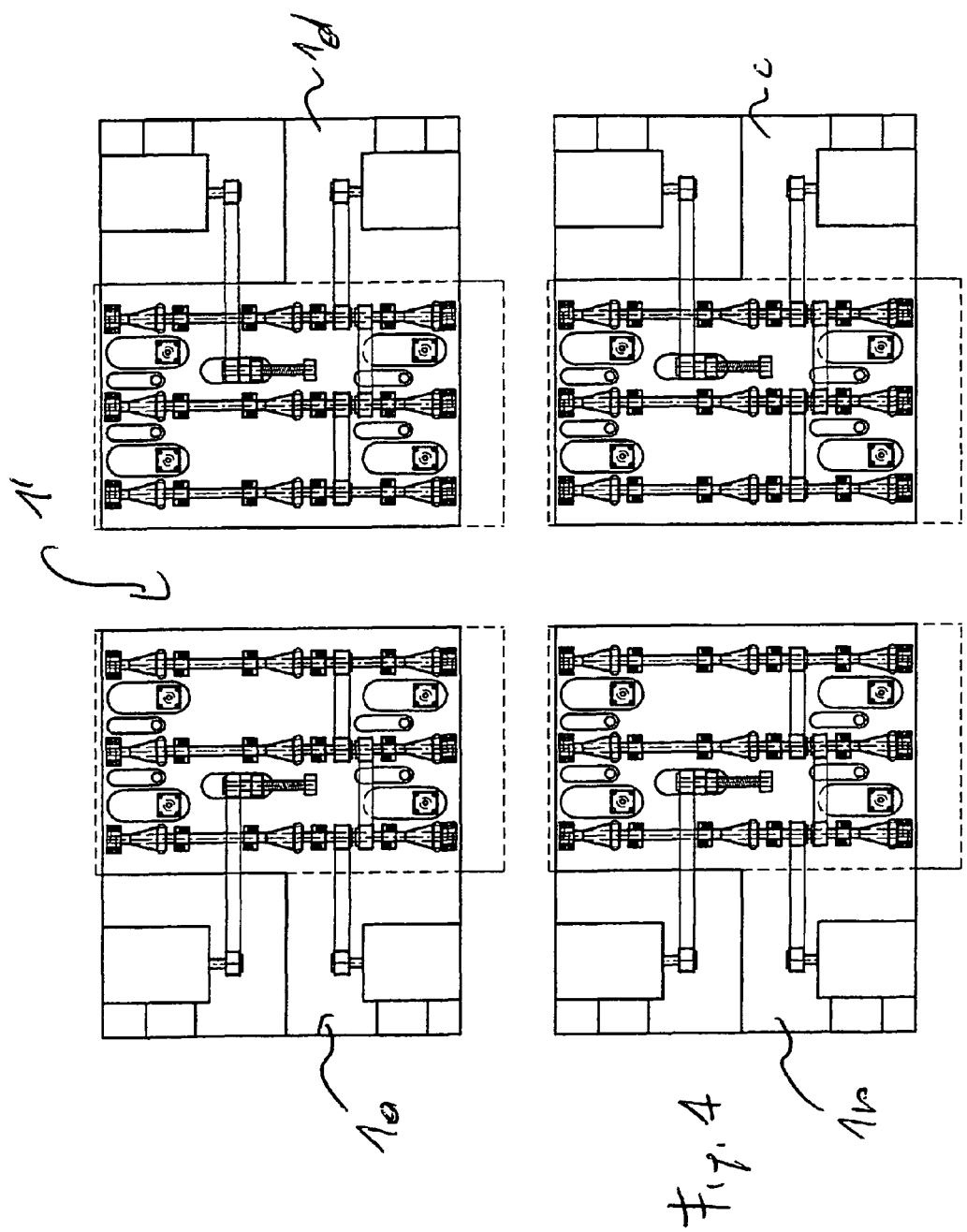
FIG. 4 shows a second side view of that exemplary embodiment.

The device illustrated in FIGS. 1 to 4 and indicated generally by reference numeral 1 comprises a base plate 2 on which four—in the illustrated embodiment—vertical guides 3a-3d are disposed in stationary arrangement. The guides carry a stepping plate 4 on which the user of the device 1 whose musculoskeletal system is to be trained and/or analyzed will come to stand. In the presently described embodiment it will be assumed for the sake of simplicity that four legs of a horse are standing on the stepping plate 4. However, this does not limit the universality of the explanations that follow. Of course the described device 1 can be used also for other animals or for two-legged organisms. The number of vertical guides 3a-3d is selected in each case to guarantee a safe support for the stepping plate 4, and especially to prevent any undesirably tilting effect in operation of the device 1, even when used by heavy users.

Between the base plate 2 and the stepping plate 4 there is arranged an intermediate plate 6 that can be displaced along a guide 5 and that carries a driving mechanism indicated generally by 10 through which a vertical movement of the stepping plate, guided by the vertical guides 3a-3d, can be generated in the way described hereafter. The driving mechanism 10 comprises for this purpose a corresponding number of drive shafts 11a-11c on which are arranged a corresponding number of cams 12a-12c. In the illustrated embodiment three drive shafts 11a-11c, each comprising three cams 12a-12c, will be deemed to exist. However, it will be obvious to the man of the art that the selected numbers are of an exemplary nature only: In principle, it is sufficient to provide a single drive shaft—for example the drive shaft 11b—with a single cam—for example the cam 12b—as such an embodiment already would be sufficient to produce a vertical movement of the stepping plate 4. If necessary, lateral guides would have to be provided for the stepping plate 4 in the case of such an embodiment. The described solution of three drive shafts 11a-11c, each with three cams 12a-12c, provides the advantage that the vertical movement produced by the driving mechanism 10 will be transmitted in this case to the corner zones and to the center zone of the stepping plate 4 so that a stable up and down movement of the stepping plate 4 will be ensured.

As can be seen in FIG. 1, a roll 13a-13c is arranged above each cam 12a-12c of the drive shaft 11a-11c, and is connected to the bottom surface 4' of the stepping plate 4 by a corresponding holder 14. The axes 14a-14c of the rolls 13a-13c are provided in collinear arrangement relative to the respective drive shaft 11a-11c so that the running surfaces 13a'-13c' of the rolls 13a-13c are permitted to roll on the surfaces 12a'-12c' of the cams 12a-12c.

As can be seen best in FIG. 2, the drive shafts 11a-11c, being seated in bearing elements 18, are driven by a motor 20; in the illustrated embodiment a drive spindle 21 of the motor 20 is connected via a toothed belt 22a to a toothed gear 23a of the first drive shaft 11a. The latter carries a second gear 23a' which is connected via a toothed belt 22b to a first gear 23b. A second gear 23b' of the second drive shaft 11b is connected to a gear 23c' of the third drive shaft 11c via a further toothed belt 22c. The described embodiment causes all the three drive shafts 11a-11c to be driven in synchronism. In combination with the in-phase orientation of the cams 12a-12c of the drive shafts 11a-11c, as illustrated in the Figures, this leads to a stable up and down movement of the stepping plate 4, without any tilting movement of the latter.

As can be seen best in FIGS. 3 and 4, the cams 12a-12c have a non-eccentric zone 14, followed by an eccentric zone 15 and another eccentric zone 16. Now, when a roll 13a-13c rolls on that zone 14 of the cam 12a-12c it runs along a path concentric to the drive shaft 11a-11c. With the consequence that a vertical stroke will not be produced, not even during rotation of the drive shaft 11a-11c, and that the stepping plate 4 will not perform an up and down movement even with the driving mechanism 10 in operation. Such a design of the initial zone 14 of the cam 12a-12c is of advantage especially when the device 1 is used for flight animals because this provides the possibility to acquaint the animals to the device 1 in that starting phase of the training and/or the analyzing operation.

The zone 14 is followed by the central zone 15 in which the distance traveled by the roll 13a-13c during one revolution of the drive axis 11a-11c increases steadily in the axial direction of the cam 12a-12c. This means that the vertical movement produced by the cam 12a-12c is clearly greater at the end of the central zone 14 than in its forward zone facing the first zone 14. By displacing the intermediate plate 6 correspondingly—as will be described hereafter—it is now possible to vary the vertical movement transmitted by the driving mechanism 10 to the stepping plate 4.

The central zone 15 is then followed by the zone 16 which, although being again of eccentric design, does not lead to any further increase of the amplitude of the vertical movement. Providing that zone 16 to produce the maximum amplitude has the advantageous effect to cause the rolls 13a-13c to roll on the outer surfaces 16' of the cams 12a-12c by a large contact surface so that smooth operation of the device 1 will be achieved even when the device 1 produces the greatest amplitude possible, which is a particular advantage especially for animals that tend to show flight reactions.

Now, in order to provide the possibility to displace the intermediate plate 6 along the guide 5, for varying the vertical movement of the stepping plate 4, the device 1 is provided with a vertical adjusting mechanism through which the vertical movement of the stepping plate 4 can be varied by varying the position between the rolls 13a-13c and the cams 12a-12c cooperating with them. This is effected, in the described embodiment, by a linear adjusting mechanism (see FIG. 2) by means of which the intermediate plate 6 and, accordingly, the cams 12a-12c arranged on it can be displaced relative to the stepping plate 4 and, accordingly, to the rolls 13a-13c disposed on its bottom surface 4'. The linear adjusting mechanism of the device 1 comprises a motor 31, preferably arranged on the base plate 2, whose drive spindle 32 is connected via a toothed gear 33 to a gear 34 of a spindle drive 35 which latter is arranged on the intermediate plate 6. Rotation of the gear 34 produces a linear displacement of the drive 35 so that the intermediate plate 6 can be moved between the minimum position illustrated in FIG. 3, in which the vertical movement of the stepping plate 4 produced by the driving mechanism 10 is at its minimum, to the maximum position illustrated in FIG. 4 in which a maximum vertical movement of the stepping plate 4 is produced.

The operation of the device 1 now is as follows:

In order to ensure that a horse or another user standing on the stepping plate 4 will not be exposed, from the very beginning, to a stepping plate 4 moving at a great vertical amplitude it is preferred that at the beginning of a training or analyzing process the intermediate plate 6 is arranged in the position illustrated in FIG. 3 in which no vertical amplitude is produced by the rolling movement of the rolls 13a-13c on the surfaces 14' of the zones 14 of the cams 12a-12c—as results from the position of the rolls 13a - 13c relative to the cams 12a-12c. For continuously increasing the vertical movement of the stepping plate 4, the intermediate plate 6 now is moved to the left in FIG. 3 by a corresponding driving motion of the linear adjusting mechanism with the effect that the vertical amplitude of the stepping plate 4, produced by the cams 12a-12c, is increased. In this way, it is possible with advantage to continuously adjust the vertical movement during operation of the device 1 by simply displacing the intermediate plate 6.

In order to achieve the maximum vertical movement, the intermediate plate 6 is moved by the linear adjusting mechanism fully to the left until it finally reaches its final position illustrated in FIG. 4 where the maximum of the vertical movement of the stepping plate 4 is reached. In order to guarantee the largest possible contact in that maximum position of the device 1, between the running surfaces of the rolls 13a-13c and the surfaces 16' of the cams 12a-12c which now carry the rolls, the cams 12a -12c have a surface that extends in parallel to the drive axis in that zone 16.

In FIGS. 1 and 2 it can be seen that the motor 20 is arranged on the intermediate plate 6. This provides the advantage that the relative position between the motor 20 and the drive shafts 11a-11c remains unchanged during displacement of the intermediate plate 6 so that power transmission between the motor 20 and the drive shafts 11a-11c can be effected via the toothed belt 22a, as has been described above. It is of course not absolutely necessary to have the drive shafts 11a-11c driven in the way described before. Instead, there is also the possibility to provide a separate motor for each of the drive shafts 11a-11c.

As can be seen in the Figures and as described for the present embodiment all cams 12a-12c of the drive shafts 11a-11c have the same phase position. With the result that a uniform up and down movement of the stepping plate 4 over its full range is achieved.

Preferably, the device 1 further comprises restoring springs 19 that act to facilitate a restoring movement of the stepping plate 4. The restoring springs 19 pass through recesses 19' of the intermediate plate 6 thereby connecting the base plate 2 with the stepping plate 4. Oblong holes 3' in the intermediate plate 6 ensure that the vertical guides 3a-3d, which support the stepping plate 4 on the base plate 2 for vertical movement, will not obstruct the vertical displacement of the intermediate plate 6.

FIGS. 5 and 6 now show a second embodiment of the device 1 where elements that correspond one to the other are indicated by the same reference numerals and will not be described here once more in detail. The main difference between the first and the second embodiments consists in that a phase angle exists between the different cams 12a-12c of the drive shafts 11a-11c. This leads to a tilting movement of the stepping plate 4 in addition to the vertical movement.

If, for example, the first cam 12a of the first drive shaft 11a and the third cam 12c of the third drive shaft 11c, and the first cam 12a of the third drive shaft 11c and the third cam 12c of the first drive shaft 11a show a phase shift of 180°—which is the case in FIGS. 5 and 6—then this has the effect that the stepping plate 4—viewed in the orientation of FIG. 5—performs the smallest vertical movement at the left-hand front at the time illustrated in FIGS. 5 and 6 and at the same time the greatest vertical movement at the left-hand back while the vertical movement at the right-hand front and the right-hand back is at its maximum or minimum. As can be seen in FIG. 6, the cam 12a of the drive shaft 11c at that time occupies the position in which it produces the greatest vertical movement. The cam 12c of the drive shaft 11c, which shows a phase shift of 180°, occupies a position in which it produces the minimum vertical movement and the central cam 12b between the two cams 12a, 12c, which has a phase shift of 90° with respect to each of the two cams 12a, 12c, produces a medium vertical movement. At the same time, the cam 12c of the drive shaft 11a is in a position in which it produces the minimum vertical movement, and the cam 12a of the drive shaft 11a produces the maximum vertical movement. Accordingly, the cams 12a-12c of the two drive shafts 11a and 11c are phase shifted by 180° one relative to the other. After half a rotation of the cams 12a-12c the vertical amplitude therefore is at its maximum at the left-hand front and at its minimum at the left-hand back. The movement of the stepping plate 4 therefore corresponds to the motion process of a horse running a piaffe. Accordingly, the device 1 also is advantageously suited to teach a horse, or any other animal, to run a given sequence of steps.

In order to permit the stepping plate 4 to follow the vertical movement of the driving mechanism 10, it is provided—as can be seen best in FIG. 5—that the connection between the vertical guides 3a-3d and the bottom surface 4' of the stepping plate 4 is configured as a hinge joint 39.

As is obvious from the above description the central cam 12b of the cam shaft 12a, 12c is not necessarily required for producing the movement of the stepping plate 4 that has been described above. The use of three cams 12a-12c on each drive shaft 11a-11c provides the advantage of an additional support for the stepping plate 4 in its central area.

It is the simplest solution for a device of that design to use only two drive shafts 11a, 11c with two or three cams 12a-12c each. When a further drive shaft, here the drive shaft 11b with its cams 12a-12c, is to be used for reasons of improved stability of the central area of the stepping plate 4, it may be necessary to adapt the vertical movement of those cams 12a, 12c. In that case it is provided that the drive shaft 11b' can be displaced relative to the intermediate plate 6 and, thus, to the other two drive shafts 11a, 11c by a mechanism not shown in the drawing. Such a possibility to displace the drive shafts 11a-11c may be optionally provided for the two other drive shafts as well.

FIG. 7 now shows a machine 1', composed of four devices 1, i.e. comprising a plurality of devices 1 of the kind described above. Such a machine 1' is especially well suited for use for four-legged users because in that case each device 1 of the machine 1' can be adapted individually to the user's leg that is to be trained and/or analyzed. One application of the described machine 1' may then again consist in teaching a horse the sequence of steps the horse has to run for a piaffe. In that case it is provided that the device 1a acting on the left-hand foreleg and the device 1c acting on the right-hand hind leg move in phase so that the two devices 1a and 1c produce their minimum or maximum amplitude, respectively, at the same moment. The device 1b acting on the left-hand hind leg and the device 1d acting on the right-hand foreleg then operate with a phase shift of 180°.

From the above description it is clearly obvious to the man of the art that the intermediate plate 6 has the sole function to permit the vertical movement of the stepping plate 4 to be adjusted during the training/treatment process. When that advantageous effect is not desired or not necessary then it is a matter of course to the man of the art that he can do without an intermediate plate 6 which can be displaced relative to the stepping plate 4, and that instead he can arrange a driving mechanism 10 on the base plate 2. However, there is also the possibility to maintain the intermediate plate 6 but to make it non-displaceable.

It has been assumed for the purpose of the description of the devices 1 that the drive shafts 11a-11c are driven by a motor 20. However, it is of course also possible to provide a separate motor for each of the drive shafts 11a-11c.

In summary, it can be said that the described device 1 provides a particularly easy way of performing a training, including a training to perform a special motion process, and/or a recovery treatment, as well as an analysis of the musculoskeletal system of a user, the device 1 being especially well suited, due to its mechanical structure, for heavy users such as horses, camels, etc.

The invention claimed is:

1. A device for training and/or analyzing a musculoskeletal system of a user, comprising:
   a stepping plate mounted on a base plate and being periodically and/or aperiodically movable by means of a driving mechanism, the driving mechanism including
   at least one drive shaft on which at least one cam is disposed, and
   at least one roll arranged to roll on an outer surface of the at least one cam and being disposed on a bottom surface of the stepping plate,
   wherein
   the stepping plate of the device is connected to the base plate by means of vertical guides that are stationarily disposed on the base plate, so that the stepping plate, supported in this way, can follow a vertical movement effected by the driving mechanism;
   the at least one cam has a first eccentric zone of a truncated design, so that a distance traveled by the at least one roll, rolling on a surface of the first eccentric zone, increases along an axial extension of the at least one cam; and
   the device comprises a vertical adjusting mechanism which allows a lift of the stepping plate to be modified by changing a position between the at least one roll and the at least one cam that co-operates with the at least one roll.

2. The device as defined in claim 1, wherein the eccentric zone of the at least one cam is followed by a non-eccentric zone.

3. The device as defined in claim 1, wherein the eccentric zone is followed by another eccentric zone which has an outer surface concentric to the at least one drive shaft.

4. The device as defined in claim 1, wherein
   the device has at least two drive shafts, each with at least two cams, and
   at least four rolls, each cooperating with at least a respective one of the cams, are arranged on the bottom surface of the stepping plate.

5. The device as defined in claim 1, wherein
   the device comprises three drive shafts with at least three cams each, and at least six rolls are disposed on the bottom of the stepping plate.

6. The device as defined in claim 1, wherein the vertical adjusting mechanism for the vertical movement comprises a linear adjusting unit, and the position of the at least one cam relative to the cooperating roll can be varied by the linear adjusting unit.

7. The device as defined in claim 1, wherein the device comprises an intermediate plate disposed between the base plate and the stepping plate, with the at least one drive shaft arranged thereon, and the intermediate plate can be displaced by the linear adjusting unit relative to the stepping plate.

8. The device as defined in claim 1, wherein the at least one drive shaft has a plurality of cams having a same phase position.

9. The device as defined in claim 1, wherein the driving mechanism includes a first drive shaft and a second drive shaft; and the at least one cam of the first drive shaft and at least one cam of the second drive shaft have different phase positions.

10. The device as defined in claim 1, further comprising an intermediate plate disposed between the base plate and the stepping plate, wherein the at least one drive shaft can be displaced relative to the intermediate plate on which it is carried.

11. The device as defined in claim 1, wherein the stepping plate is connected with the vertical guides via articulated connections.

12. The device as defined in claim 1, wherein the base plate and the stepping plate are connected via at least one restoring spring.

13. A machine for training and/or for analyzing a musculoskeletal system of a user, comprising at least two cooperating devices as defined in claim 1.

* * * * *